United States Patent [19]

Takahashi

[11] Patent Number: 5,070,418
[45] Date of Patent: Dec. 3, 1991

[54] CASSETTE EJECTION APPARATUS
[75] Inventor: Kazushi Takahashi, Chichibu, Japan
[73] Assignee: Canon Denshi Kabushiki Kaisha, Chichibu, Japan
[21] Appl. No.: 506,256
[22] Filed: Apr. 9, 1990
[30] Foreign Application Priority Data
Apr. 13, 1989 [JP] Japan ................................ 1-91830
[51] Int. Cl.⁵ .............................................. G11B 17/04
[52] U.S. Cl. ...................................................... 360/71
[58] Field of Search ...................... 360/71, 96.5, 96.6, 360/99.02, 99.03, 99.06, 99.07
[56] References Cited
U.S. PATENT DOCUMENTS
4,628,376 12/1986 Kato et al. ............................ 360/71
4,670,802 6/1987 Ogawa et al. .................... 360/99.03

Primary Examiner—Robert S. Tupper
Attorney, Agent, or Firm—Spencer & Frank

[57] ABSTRACT

An apparatus for ejecting a cassette containing therein a recording/reproducing medium by the driving force produced by an ejection motor has an ejection switch for commanding the cassette ejection and a cassette switch for detecting the cassette loading condition. When the cassette switch has detected the casette loading condition simultaneous with turning on of the ejection switch and when the ejection switch is kept turned on in excess of a predetermined time period continuously regardless of the cassette switch condition, the cassette ejection controller executes the cassette ejection.

10 Claims, 3 Drawing Sheets

CASSETTE EJECTION APPARATUS

BACKGROUND OF THE INVENTION

1. Field of the Invention

The present invention relates to an apparatus for ejecting a cassette containing therein a recording/reproducing medium (to be referred to hereinafter for brevity as "a cassette" unless otherwise stated), and more particularly to a cassette ejection apparatus which ejects a loaded cassette by driving means such as a motor, a solenoid or the like.

2. Description of the Prior Art

A conventional magnetic disk unit which uses a 3.5-in. floppy disk incorporates a cassette ejection apparatus for ejecting a cassette out of the magnetic disk unit.

In such a cassette ejection apparatus, a loaded cassette can be ejected from the unit by actuating a switch with a light force because the apparatus is driven by a motor. Moreover, the cassette ejection apparatus can be controlled by software incorporated in a host apparatus which controls the magnetic disk unit.

The conventional cassette ejection apparatus ejects a loaded cassette under the condition that both an ejection switch (such as a push switch) and a cassette switch (such as a microswitch, a photodiode or the like) are turned on simultaneously. The ejection switch is turned on by an operator while the cassette switch is automatically turned on when a cassette is loaded into the magnetic disk unit or the like.

FIG. 1 is a time chart used to explain the mode of operation of a magnetic disk unit incorporating therein a cassette ejection apparatus substantially similar in construction to that disclosed in U.S. Pat. No. 4,628,376.

After a cassette is inserted in the cassette insertion slot of the magnetic disk unit at time $T_0'$, it is loaded in the magnetic disk unit at time $T_1'$ and the cassette switch is turned on.

When it is desired to eject the cassette out of the magnetic disk unit, the ejection switch is turned on manually at $T_2'$. Then under the condition that the cassette switch is kept turned on, a controller of the cassette ejection apparatus energizes an ejection motor. Then the ejection motor rotates a cam through one rotation so that the cassette ejection apparatus ejects the cassette out of the magnetic disk unit. One rotation of the cam is detected by a home-position switch, which is turned on when the cam is at home position.

The ejection of the cassette is accomplished before $T_3'$ at which time the cam has made one rotation and the home-position switch is turned on. When the home-position switch is turned on, the controller de-energizes the ejection motor.

As described above, by the operation carried out from time $T_0'$ to $T_3'$, the cassette is loaded in and ejected out of the magnetic disk unit.

In the case of a magnetic disk unit of the type described above, when foreign matter intrudes into the cassette loading mechanism or the cassette ejection mechanism, or when foreign matter, i.e., matter other than a cassette is inserted into the cassette insertion slot of the magnetic disk unit, such foreign matter must be removed. For this purpose, the magnetic disk unit must be provided with a mechanical emergency ejection mechanism in addition to the cassette ejection apparatus such as disclosed in U.S. Pat. No. 4,628,376. In order to obtain the force needed for discharging foreign matter, it is required to insert a pin or the like through a small hole of the magnetic disk unit to the emergency ejection mechanism or to push the bottom of the magnetic disc unit only to energize the emergency ejection mechanism. As described above, the emergency ejection mechanism operates independently of the cassette ejection apparatus.

The mode from $T_4'$ to $T_5'$ in FIG. 1 corresponds to a condition in which a cassette inserted into the cassette insertion slot of the magnetic disk unit cannot be correctly loaded therein because of the presence of foreign matter. It also corresponds to a condition in which foreign matter cannot be loaded into the magnetic disk unit because the inserted matter is foreign matter. Under these conditions, the emergency ejection mechanism of the type described above must be mechanically operated, but the cassette ejection apparatus is not activated at all. The reason is as follows. During the time period from $T_4'$ to $T_5'$ in FIG. 1, the cassette switch is not turned on for almost all conditions so that even when the controller detects that the ejection switch is kept turned on, the cassette ejection operation cannot be carried out because the cassette switch is not turned on.

As described above, in addition to the cassette ejection apparatus, the conventional magnetic disk unit must be provided with an independent mechanical emergency ejection mechanism. As a result, there arises the problems that the construction of the conventional magnetic disk unit becomes very complicated and the magnetic disk unit cannot be made compact in size and light in weight.

SUMMARY OF THE INVENTION

In view of the above, the primary object of the present invention is to provide an apparatus for ejecting a cassette containing a recording/reproducing medium which can eliminate the use of a mechanical emergency ejection mechanism and also can accomplish the function of the emergency ejection of foreign matter intruded into the cassette insertion slot of the magnetic disk unit or a cassette under some conditions.

In the first aspect of the present invention, an apparatus for ejecting a cassette containing therein a recording/reproducing medium from a disk unit comprises:

driving means for producing a predetermined driving force for ejecting the cassette;

command means for commanding ejection of the cassette;

detection means for detecting a loaded condition of the cassette;

ejection control means for causing the driving means to carry out a cassette ejection operation in response to an ejection command derived from the command means when the cassette loaded condition is detected from an output of the detection means; and emergency ejection control means for causing the driving means to execute the cassette ejection operation according that the ejection command from the command means continues in excess of a predetermined time period regardless of the output of the detection means.

Here, the command means may be an ejection switch incorporated in a recording/reproducing apparatus.

The disk unit may be a magnetic disk drive unit connected to a host apparatus and the ejection command is a remote control signal derived from the host apparatus.

The driving means may comprise a cam which energizes a cassette ejection mechanism for ejecting the cassette out of a recording/reproducing apparatus.

In the second aspect of the present invention, a recording/reproducing apparatus using a disk-like recording/reproducing medium, comprises:

ejection means for ejecting the recording/reproducing medium from a predetermined, recording/reproducing position in the recording/reproducing apparatus;

command means for outputting a command to operate the ejection means;

control means for operating the ejection means compulsorily according that the command outputted from the command means continues in excess of predetermined time period, while operating the ejection means only in the case that the recording/reproducing medium exists at the predetermined recording/reproducing position when the command does not continue in excess of the predetermined time period.

Here, the command means may be an ejection switch incorporated in the recording/reproducing apparatus.

The recording/reproducing apparatus may be a magnetic disk drive unit connected to a host apparatus and the command is a remote control signal derived from the host apparatus.

The recording/reproducing apparatus may further comprise:

a detection means for detecting whether the disk-like recording/reproducing medium exists or not at the predetermined recording/reproducing position.

Here, the control means may operate the ejection means in response to a detection signal of the detection means and a command signal of the command means, when the command does not continue in excess of the predetermined time period.

The above and other objects, effects, features and advantages of the present invention will become more apparent from the following description of embodiments thereof taken in conjuction with the accompanying drawings.

DETAILED DESCRIPTION OF A PREFERRED EMBODIMENT

Figure 1:
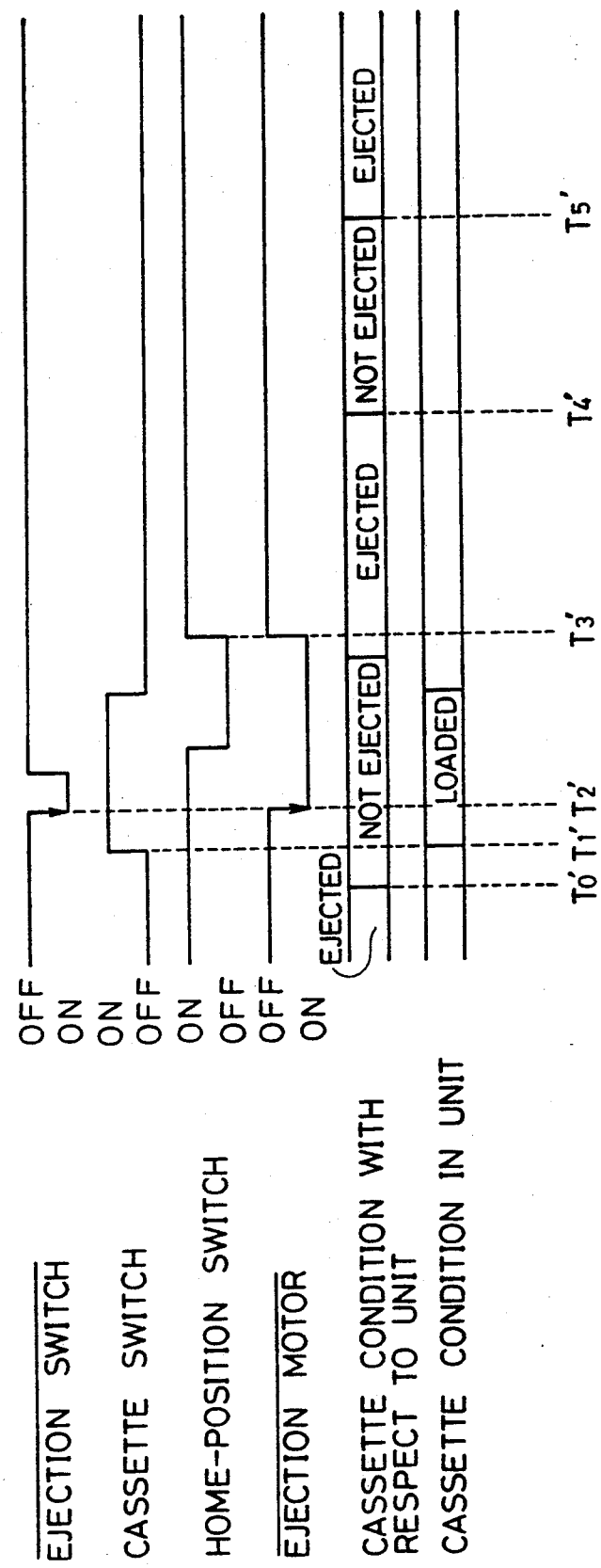
FIG. 1 is a timing chart illustrating the insertion and ejection operation of a cassette into and out of a magnetic disk unit incorporating a conventional apparatus for ejecting a cassette containing therein a recording/reproducing medium from the magnetic disc unit.
Figure 2:
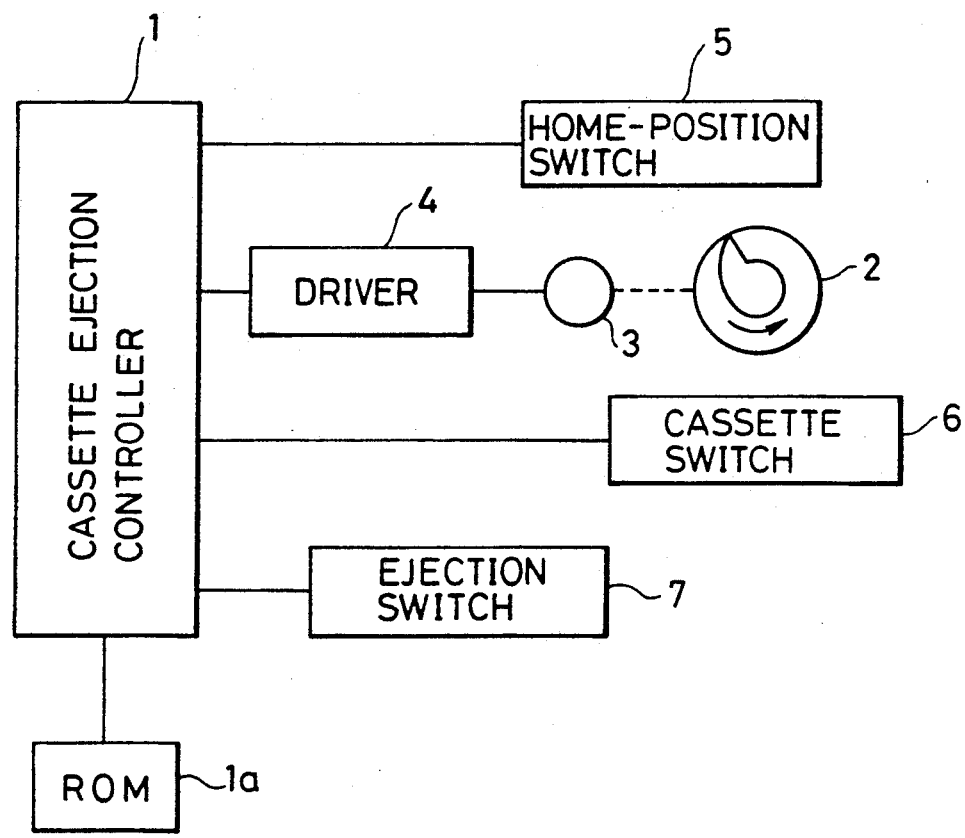
FIG. 2 is a block diagram showing an embodiment of a cassette ejection apparatus in accordance with the present invention.

Now a preferred embodiment of a cassette ejection apparatus in accordance with the present invention will be described in detail with reference to FIGS. 2 and 3.

A cassette ejection controller generally indicated by reference numeral 1 comprises a microprocessor and its associated parts (not shown) and controls an ejection motor 3 through a driver 4 in accordance with a program stored in a ROM 1a. The energized ejection motor 3 causes a cam 2 to rotate so that a conventional cassette ejection mechanism is activated to eject a cassette from a magnetic disk unit.

Reference is hereby made to U.S. Pat. No. 4,670,802 for details of a suitable cassette ejection mechanism.

The controller 1 is connected to a home-position switch 5 which detects the position of the original point during one rotation of the cam 2. Then the controller 1 establishes a closed loop control system for controlling the motor 3 so as to cause the cam 2 to make one rotation at one time with the original point as a reference point. When a cassette is loaded at the operative position of the magnetic disk unit, a cassette switch 6 is turned on indicating the correct loading of the cassette.

The controller 1 is also connected to an ejection switch 7. The controller 1 causes the cam 2 to make one rotation under one of the conditions that the ejection switch 7 is turned on. Then the conventional cassette ejection mechanism is activated to eject the loaded cassette out of the magnetic disk unit. The ejection switch 7 may be of the type comprising a stationary contact and a movable contact. Instead of the output signal derived from the ejection switch 7, the remote signal may be delivered from a host apparatus which controls the magnetic disk unit.

Therefore, under the condition that both the cassette switch 6 and the ejection switch 7 are kept turned on, the controller 1 energizes the motor 3 to cause the cam 2 to make one rotation. The above-mentioned means or mechanism capable of accomplishing such functions is called an automatic ejection control means.

Moreover, the controller 1 is provided with an emergency ejection control means which detects a time period when the ejection switch 7 is turned on. When the detected or measured time period is in excess of a predetermined time (A seconds), the controller 1 energizes the motor 3 to cause the cam 2 to make one rotation regardless of whether the cassette switch 6 is turned on or not.

Figure 3:
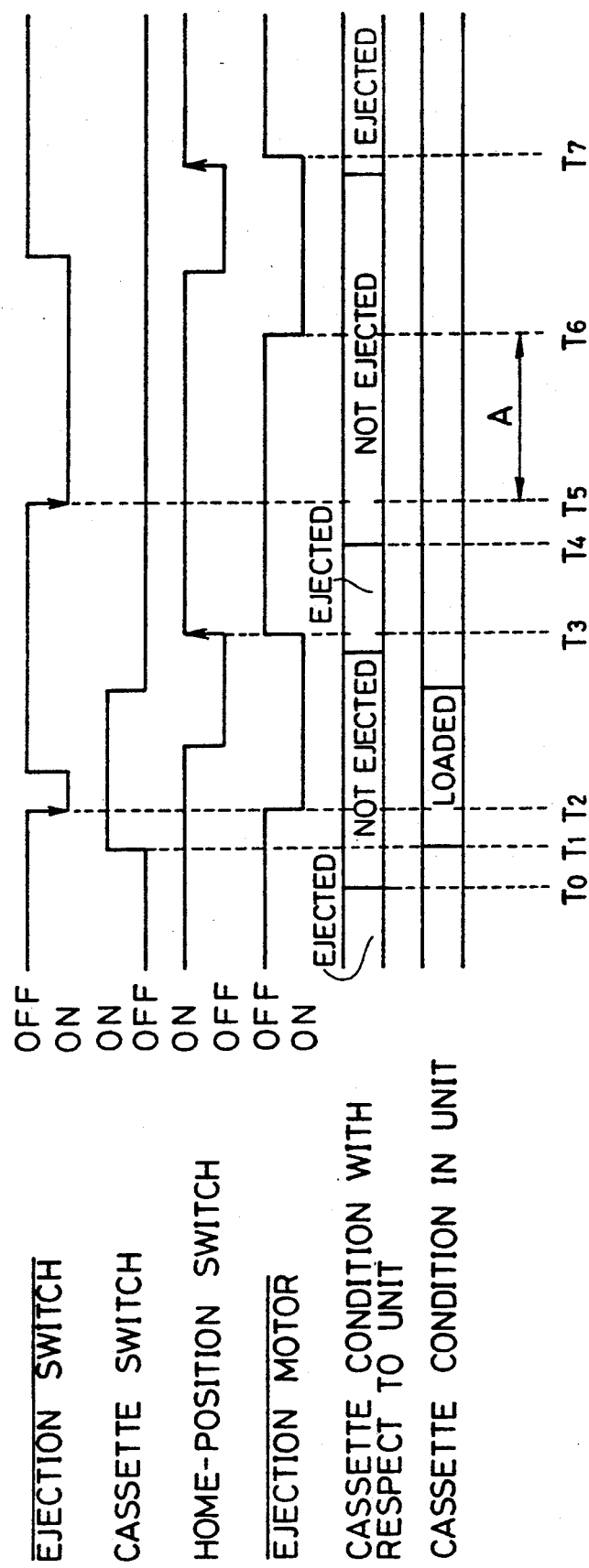
FIG. 3 is a timing chart illustrating the cassette insertion and cassette ejection operation carried out by a magnetic disk unit incorporating therein the cassette ejection apparatus shown in FIG. 2.

When a cassette is inserted into the cassette insertion slot of the magnetic disk unit at $T_0$ in FIG. 3, the cassette is loaded at its predetermined position at $T_1$ so that the cassette switch 6 is turned on.

Thereafter when the ejection switch 7 is turned on at $T_2$, at which time it is desired to eject the cassette out of the magnetic disk unit, the condition exists for activating the automatic ejection control means of the controller 1; that is, the condition that both the cassette switch 6 and the ejection switch 7 are turned on is satisfied. Then the motor 3 is energized to cause the cam 2 to make one rotation thereby ejecting the cassette out of the magnetic disk unit. The home position switch 5 is kept turned off during the time when the cam 2 makes one rotation. The cassette ejection operation is accomplished at $T_3$ when the cam 2 has made one rotation so that the home-position switch 5 is turned on.

As described above, from $T_0$ to $T_3$, the operation for loading a cassette into and ejecting it out of the magnetic disk unit is normally carried out.

Next at time $T_5$ the ejection switch 7 is turned on in order to remove foreign matter trapped in the magnetic disk unit. The time period during which the ejection switch 7 is turned on continues in excess of A seconds. The reason is as follows. When foreign matter is trapped in the magnetic disk unit, in some cases the cassette switch 6 is not turned on. As a result, even when the ejection switch 7 is turned on, the condition for activating the automatic ejection control means of the controller 1 is not satisfied.

When the ejection switch 7 is turned on in excess of A seconds, the emergency ejection control means of the controller 1 is activated. Then the motor 3 is energized to cause the cam 2 to make one rotation so that foreign matter is ejected out of the magnetic disk unit. In this case, the home-position switch 5 is kept turned off while the cam 2 makes one rotation. The foreign matter ejection operation is accomplished until $T_7$ when the cam 2 has made one rotation so that the home-position switch 5 is turned on.

As described above, the cassette ejection apparatus in accordance with the present invention ejects foreign matter out of the magnetic disk unit by the emergency ejection control means of the controller 1. As a result, the present invention can eliminate the conventional mechanical emergency ejection mechanism for ejecting foreign matter out of the magnetic disk unit.

It follows therefore that the mechanical assembly of the magnetic disk unit can be simplified so that the magnetic disk unit itself can be made compact in size and light in weight.

The reason why the ejection switch 7 is kept turned on for a time A is that even when the ejection switch 7 is erroneously turned on, the ejection of the cassette can be prevented. Furthermore, a mechanism which causes the cam 2 to return to its home position even when the cam 2 is caused to make a normal one idle rotation in response to the erroneous operation of the ejection switch 7 can be provided; that is, the mechanism for returning the cam to its home position after the cam 2 has made one rotation may be provided.

It is now apparent to those skilled in that art that the present invention may be equally applied to various apparatuses in addition to the magnetic disk unit described above. The present invention can be used as the cassette ejection apparatus incorporated in a magnetic disk drive unit, an optical disk drive unit, a magnetic tape unit and so on.

So far it has been described that in response to the output signal from the ejection switch 7, the emergency ejection control means of the controller 1 is activated, but it is apparent to those skilled in the art that the emergency ejection control means may be activated in response to a remote control signal derived from the host apparatus which controls the magnetic disk unit or the like.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. An apparatus for ejecting a cassette containing therein a recording/reproducing medium from a disk unit comprising:
   driving means for producing a predetermined driving force for ejecting said cassette;
   command means for commanding ejection of said cassette;
   detection means for detecting a loaded condition of said cassette;
   ejection control means for causing said driving means to carry out a cassette ejection operation in response to an ejection command from said command means when the cassette loaded condition is indicated by an output of said detection means; and
   emergency ejection control means for causing said driving means to execute the cassette ejection operation in the case that the ejection command from said command means continues in excess of a predetermined time period regardless of the output of said detection means.

2. An apparatus for ejecting a cassette as claimed in claim 1, wherein said command means is an ejection switch incorporated in said disc unit.

3. An apparatus for ejecting a cassette as claimed in claim 1, wherein said disk unit is a magnetic disk drive unit connected to a host apparatus and said ejection command is a remote control signal from said host apparatus.

4. An apparatus for ejecting a cassette as claimed in claim 1, wherein said driving means includes a cam which energizes a cassette ejection means for ejecting the cassette.

5. A recording/reproducing apparatus using a disk-like recording/reproducing medium, comprising:
   ejection means for ejecting said recording/reproducing medium from a predetermined, recording/reproducing position in said recording/reproducing apparatus;
   detection means for detecting whether or not said medium exists at said predetermined recording/reproducing position;
   command means for outputting a command to operate said ejection means;
   control means for operating said ejection means in the case that said command outputted from said command means continues in excess of a predetermined time period, and operating said ejection means in response to a detection signal of said detection means and a command signal of said command means in the case that said command does not continue in excess of said predetermined time period.

6. A recording/reproducing apparatus as claimed in claim 5, wherein said command means is an ejection switch incorporated in said recording/reproducing apparatus.

7. A recording/reproducing apparatus as claimed in claim 5, wherein said recording/reproducing apparatus is a magnetic disk drive unit connected to a host apparatus and said command is a remote control signal from said host apparatus.

8. In combination with a recording/reproducing apparatus:
   cassette loading means for carrying a cassette inserted through an opening of said apparatus to a predetermined loaded position therein, and ejecting said cassette from said predetermined loaded position out of said opening;
   detecting means for detecting that said cassette has been inserted into said apparatus through said opening;
   instruction means for instructing that said cassette is to be ejected from said apparatus; and
   control means for normally operating said cassette loading means to eject said cassette out of said opening in response to an instruction signal output from said instruction means and an output of said detecting means, and operating said cassette loading means to eject said cassette out of said opening in the case that the instruction signal output from said instruction means continues in excess of a predetermined time period regardless of the output of said detecting means.

9. An apparatus according to claim 8, wherein said cassette has a disk-shaped magnetic recording medium rotatably mounted therein, and said apparatus further includes a rotating means for rotating said recording medium at said predetermined loading position.

10. An apparatus according to claim 8, wherein said instruction means is an ejection switch.

* * * * *